United States Patent
Lin et al.

(10) Patent No.: US 11,704,246 B2
(45) Date of Patent: Jul. 18, 2023

(54) MEMORY SYSTEM FOR MAINTAINING DATA CONSISTENCY AND OPERATION METHOD THEREOF

(71) Applicant: MACRONIX INTERNATIONAL CO., LTD., Hsinchu (TW)

(72) Inventors: Bo-Rong Lin, Taichung (TW); Ming-Liang Wei, Kaohsiung (TW); Hsiang-Pang Li, Zhubei (TW); Nai-Jia Dong, Taipei (TW); Hsiang-Yun Cheng, Taoyuan (TW); Chia-Lin Yang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 47 days.

(21) Appl. No.: 17/539,257

(22) Filed: Dec. 1, 2021

(65) Prior Publication Data
US 2023/0033998 A1 Feb. 2, 2023

Related U.S. Application Data

(60) Provisional application No. 63/226,764, filed on Jul. 29, 2021.

(51) Int. Cl.
*G06F 12/0804* (2016.01)
(52) U.S. Cl.
CPC .... *G06F 12/0804* (2013.01); *G06F 2212/601* (2013.01)
(58) Field of Classification Search
CPC .......................... G06F 12/0804; G06F 2212/601
See application file for complete search history.

(56) References Cited

U.S. PATENT DOCUMENTS

| | | | | |
|---|---|---|---|---|
| 11,599,557 | B2 * | 3/2023 | Pleshachkov | G06F 16/273 |
| 2014/0258228 | A1 * | 9/2014 | Bhide | G06F 16/23 707/625 |
| 2015/0370655 | A1 * | 12/2015 | Tucek | G06F 11/1471 714/15 |
| 2016/0179687 | A1 * | 6/2016 | Kumar | G06F 12/0895 711/135 |
| 2016/0239431 | A1 * | 8/2016 | Li | G06F 12/1009 |
| 2020/0319980 | A1 | 10/2020 | Marathe et al. | |

FOREIGN PATENT DOCUMENTS

| | | |
|---|---|---|
| CN | 108292221 A | 7/2018 |
| CN | 108874588 A | 11/2018 |
| CN | 110618788 A | 12/2019 |
| CN | 111400268 A | 7/2020 |

* cited by examiner

*Primary Examiner* — Prasith Thammavong
(74) *Attorney, Agent, or Firm* — McClure, Qualey & Rodack, LLP

(57) ABSTRACT

A memory system for maintaining data consistency and an operation method thereof are provided. The operation method includes: receiving a first data in a first cache of a first memory from a processor; reading the first data from the first cache and writing the first data as a redo log into a log buffer of the first memory; writing the redo log from the log buffer into a memory controller of the processor; performing an in-memory copy in a second memory to copy a second data as an undo log, wherein the second data is an old version of the first data; and writing the redo log from the memory controller into the second memory for covering the second data by the redo log as a third data, wherein the redo log, the third data and the first data are the same.

20 Claims, 8 Drawing Sheets

MEMORY SYSTEM FOR MAINTAINING DATA CONSISTENCY AND OPERATION METHOD THEREOF

CROSS-REFERENCE TO RELATED ART

This application claims the benefit of U.S. Provisional application Ser. No. 63/226,764, filed Jul. 29, 2021, the disclosure of which is incorporated by reference herein in its entirety.

TECHNICAL FIELD

The disclosure relates in general to a memory system for maintaining data consistency and an operation method thereof.

BACKGROUND

Persistent memory (PM) keeps data even after power off. PM has the following characteristics; non-volatile, no data loss even if power off; byte addressing, i.e. CPU loading and storing instructions: and large capacity compared with DRAM (dynamic random access memory).

In operating PM, write-ahead logging is used for ensuing data integrity. Further, in database systems, write-ahead logging provides atomicity and durability. Atomicity refers to that it guarantees that either all of the transactions succeed or none of it does. Durability refers to that once a transaction is successfully committed, the modified data is persistent, regardless of disk crashes.

Still further, recovering algorithm is classified as: redo logging and undo logging. Redo logging has advantages of asynchronous data update, but disadvantages of double write and read redirection. Undo logging has advantages of direct data update, but disadvantages of synchronous data update limitation and double write.

Thus, it is desirable to have a memory system for maintaining data consistency and an operation method thereof, which solve the prior problems of the recovering algorithm, provides high atomicity and durability and maintains data consistency.

SUMMARY

According to one embodiment, an operation method for a memory system is provided. The operation method includes: receiving a first data in a first cache of a first memory from a processor; reading the first data from the first cache of the first memory and writing the first data as a redo log into a log buffer of the first memory, wherein the first data and the redo log are the same; writing the redo log from the log buffer into a memory controller of the processor; performing an in-memory copy in a second memory to copy a second data as an undo log, wherein the second data is an old version of the first data; and writing the redo log from the memory controller into the second memory for covering the second data by the redo log as a third data, wherein the redo log, the third data and the first data are the same, and the memory controller and the second memory have persistence.

According to another embodiment, a memory system is provided. The memory system includes: a processor; a first memory coupled to the processor; and a second memory coupled to the first memory, wherein a first data is received in a first cache of the first memory from the processor; the first data is read from the first cache of the first memory and the first data is written as a redo log into a log buffer of the first memory, wherein the first data and the redo log are the same; the redo log is written from the log buffer into a memory controller of the processor; an in-memory copy is performed in the second memory to copy a second data as an undo log, wherein the second data is an old version of the first data; and the redo log is written from the memory controller into the second memory for covering the second data by the redo log as a third data, wherein the redo log, the third data and the first data are the same, and the memory controller and the second memory have persistence.

Figure 1:
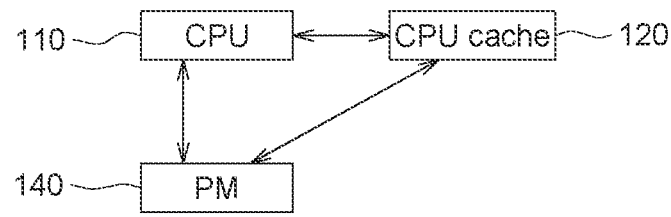
FIG. 1 shows a functional block diagram of a memory system according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a functional block diagram of a memory system according to one embodiment of the application. As shown in FIG. 1, the memory system 100 according to one embodiment of the application at least includes: a central processing unit (CPU) 110, a central processing unit (CPU) cache 120 and a persistent memory (PM) 140. The CPU 110 is coupled to the CPU cache 120 and the PM 140. The CPU cache 120 at least includes a first layer cache (L1 cache), a log buffer and a last level cache (LLC). In the following, the CPU cache 120 is also referred as a first memory and the PM 140 is also referred as a second memory. The L1 cache may be also referred as a first cache and the LLC may be also referred as a second cache. In one embodiment of the application, "redo logging operation" refers to log (copy) new version of data (i.e. new data) as a redo log and "undo logging operation" refers to log (copy) old version of data (i.e. old data) as an undo log.

Figure 2:
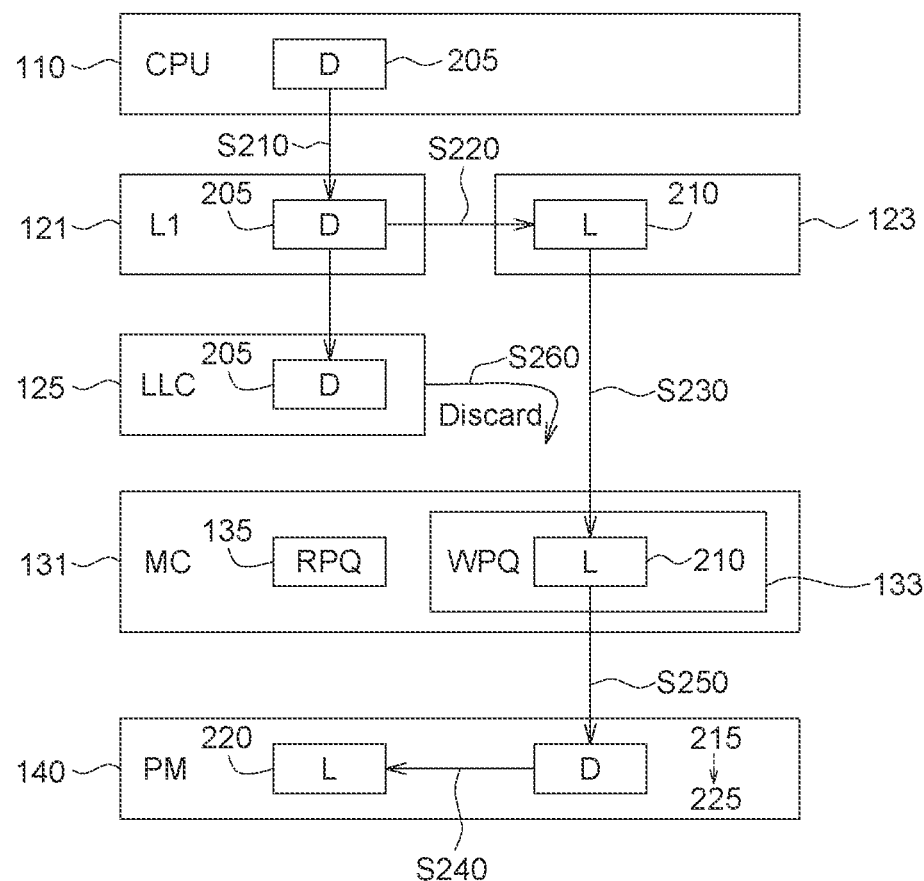
FIG. 2 shows an operation diagram according to the memory system according to one embodiment of the application.

FIG. 2 shows an operation diagram according to the memory system 100 according to one embodiment of the application. In step S210, the CPU 110 sends new data 205 to the L1 cache 121. In step S220, the data 205 is read from the L1 cache 121 and the data 205 is written as a redo log 210 into the log buffer123, wherein the data 205 and the redo log 210 is the same; and the data 205 is read from the L1 cache 121 and written as the LLC 125.

In step S230, the redo log 210 is written from the log buffer 123 into a write pending queue (WPQ) 133 of a memory controller (MC) 131 of the CPU 110. The MC 131 further includes a read pending queue (RPQ) 135. In step S240, the in-PM copy is performed in the PM 140 to log (copy) an old data 215 as an undo log 220, wherein the old data 215 is an old version of the new data 205. In step S250, the redo log 210 is written from the WPQ 133 of the MC 131 into the PM 140 for covering the old data 215 as data 225 by the redo log 210. The redo log 210 and the data 225 are the same, i.e. the data 225 and the data 205 are the same. In step S260, because the transaction is committed (that is, the redo log 210 is written from the log buffer 123 into the WPQ 133 of the MC 131), data 205 written in the LLC 125 is discarded.

As shown in FIG. 2, in one embodiment of the application, in logging operations, redo logging (for example, the step S230) and undo logging (for example, the step S240) are performed, i.e. the embodiment performs hybrid logging.

Figure 3:
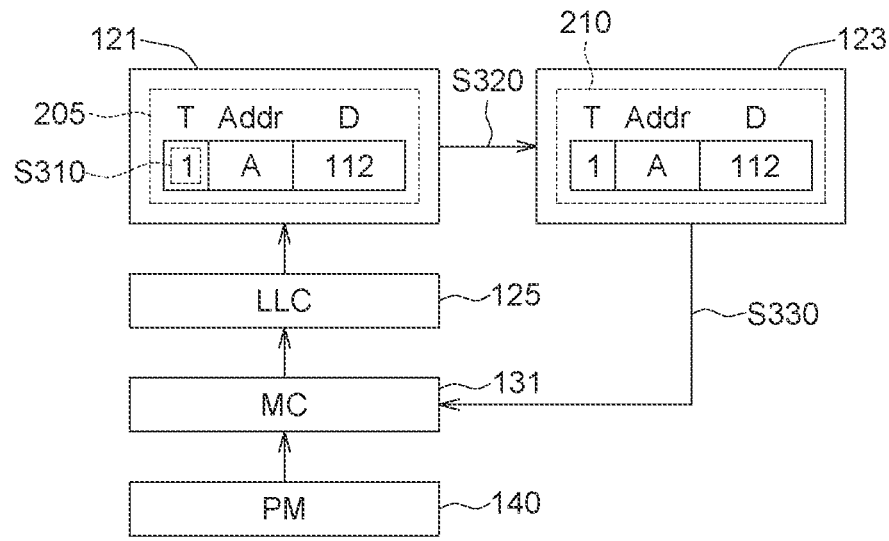
FIG. 3 shows redo logging in one embodiment of the application.

FIG. 3 shows redo logging in one embodiment of the application. As shown in FIG. 3, the data 205 includes: T bit, an address field (Addr) and a data field (D). In redo logging, the T bit of the data 205 is set as 1, as shown in step S310. When the T bit is set as 1, the cache line is a transaction cache line. In step S320, the data 205 is written from the L1 cache 121 into the log buffer 123 as the redo log 210. Similarly, the redo log 210 includes: T bit, the address field (Addy) and the data field (D). The T bit of the redo log 210 is also 1. In step S330, the redo log 210 is written into the log buffer 123 into the WPQ 133 of the MC 131. Further, the redo log 210 in the log buffer 123 is evicted from the log buffer 123 when (a) the log buffer 123 is full, or (b) the transaction about the redo log 210 is committed (that is, when the redo log 210 is written from the log buffer 123 into the MC 131).

Figure 4:
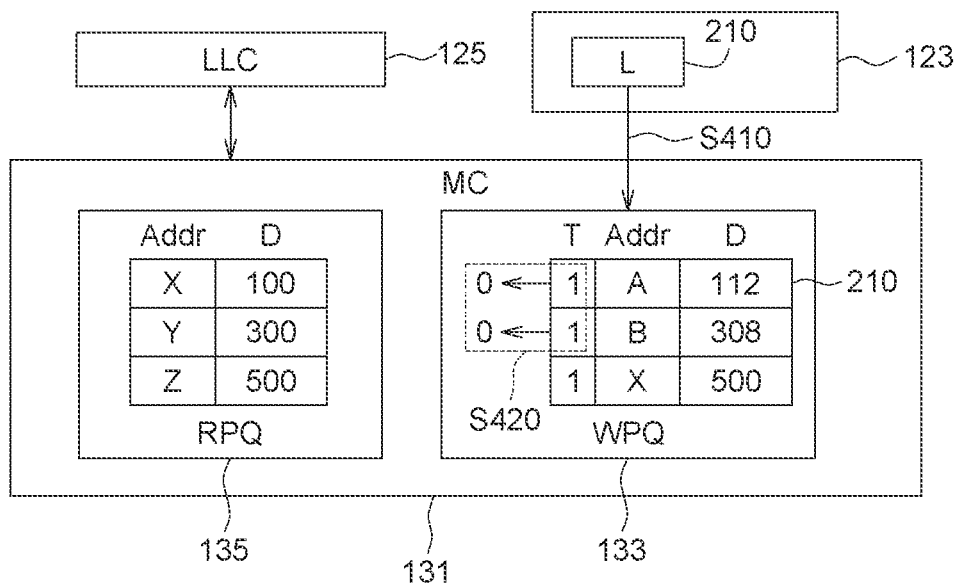
FIG. 4 shows redo logging according to one embodiment of the application.

FIG. 4 shows redo logging according to one embodiment of the application. As shown in FIG. 4, in the step S410, the redo log 210 is written from the log buffer 123 into the WPQ 133 of the MC 131. The step S410 is the step S230 in FIG. 2 or the step S330 in FIG. 3. In one embodiment of the application, the WPQ 133 of the MC 131 is used as a redo log area and thus, when the redo log is written into the WPQ 133, the redo log has persistence because the MC 131 is persistent.

Further, when the transaction is committed, a transaction commit signal is sent to the MC 131. In response to the transaction commit signal, the MC 131 sets the T bit of the redo log 210 in the WPQ 133 as 0 in the step S420, When the T bit of the redo log 210 is set as 0, the redo log 210 is transformed into a normal write request. In one embodiment of the application, the normal write request in the WPQ 133 is executed when: (A) the RPQ 135 is empty, or (2) the WPQ drain is triggered. The WPQ drain refers to execute the redo log or the normal write request queued in the WPQ to drain the redo log or the normal write request queued from the WPQ. In one embodiment of the application, when an occupation rate of the WPQ 133 is higher than a first reference value (for example but not limited by, 80%), the WPQ drain is triggered; and when the occupation rate of the WPQ 133 is lower than a second reference value (for example but not limited by, 20%), the WPQ drain is stopped.

In one embodiment of the application, it is not preferred that once data is stored in the WPQ 133, the write operation is immediately performed, which may cause a low efficiency. Thus, in one embodiment of the application, when the occupation rate of the WPQ 133 of the MC 131 meets a predetermined requirement, the data/log stored in the WPQ is written into the PM 140.

Further, in one embodiment of the application, before the transaction is committed, the redo log queued in the WPQ 133 is not allowed to be written into the PM 140 in order to prevent mistaken overwriting the old data stored in the PM 140. Thus, in one embodiment of the application, after the transaction is committed, the redo log queued in the WPQ 133 is allowed to overwrite the old data stored in the PM 140. In one embodiment of the application, the redo log in the WPQ 133 of the MC 131 also includes the T bit. When the T bit is still 1, the transaction is not committed, the transaction is still a write transaction and still to be queued in the WPQ 133. After the transaction is committed, the T bit is set as 0 and the redo log is transformed as a normal write request. When the MC 131 decides to execute the write operations, the normal write request(s) is/are written into the PM 140.

In one embodiment of the application, the MC 131 and the PM 140 both have persistence. That is, when data or logs enter into the WPQ 133 of the MC 131 of the CPU 110, the data or the logs have persistence (Le when the power is off, the data or the logs are not loss).

Ideally, if all transaction data are queued in the WPQ 133 of the MC 131, correct data are recovered even if the system is powered off.

When the transaction is not committed, if data is to be recovered, then the data is recovered as the old data. Thus, in one embodiment of the application, when the transaction is not committed, data recover is based on old data stored in the PM 140. But, after the transaction is committed, if data is to be recovered, then the data is recovered as the new data. Thus, in one embodiment of the application, after the transaction is committed, data recovered is based on the new data stored in the WPQ 133 of the MC 131.

Figure 5:
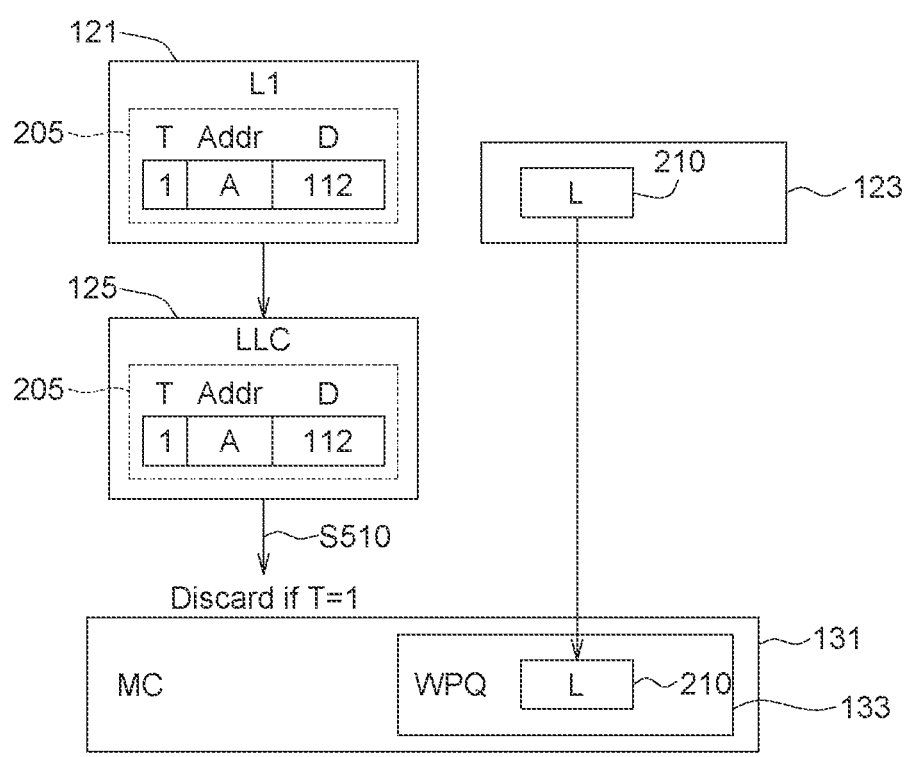
FIG. 5 shows data discard from the LLC according to one embodiment of the application.

FIG. 5 shows data discard from the LLC 125 according to one embodiment of the application. When data 205 is updated by the MC 131 (i.e. when the redo log 210 is written from the log buffer 123 into the WPQ 133 of the MC 131), the data 205 (having T bit of 1) is discarded from the LLC 125, as shown in step 3510. Operations of FIG. 5 may prevent double write issue to improve performance.

Because the WPQ 133 of the MC 131 has limited capacity, in one embodiment of the application, in-PM copy is introduced to perform undo logging in the PM 140 (as the step 3240 in FIG. 2). After the undo logging is performed, the data (i.e. the redo logs) in the WPQ 133 is allowed to be written into the PM 140 and then the WPQ 133 is drained.

However, if redo logging is performed in the PM, then the read operations need to search log areas (log blocks) first to ensure new version of data is accessed, which causes read redirection and thus read latency is increased. Thus, in one embodiment of the application, undo logging is performed in the PM to prevent the read redirection and read latency.

Further, in one embodiment of the application, during undo logging, the undo logging is performed in background inside the PM.

Figure 6:
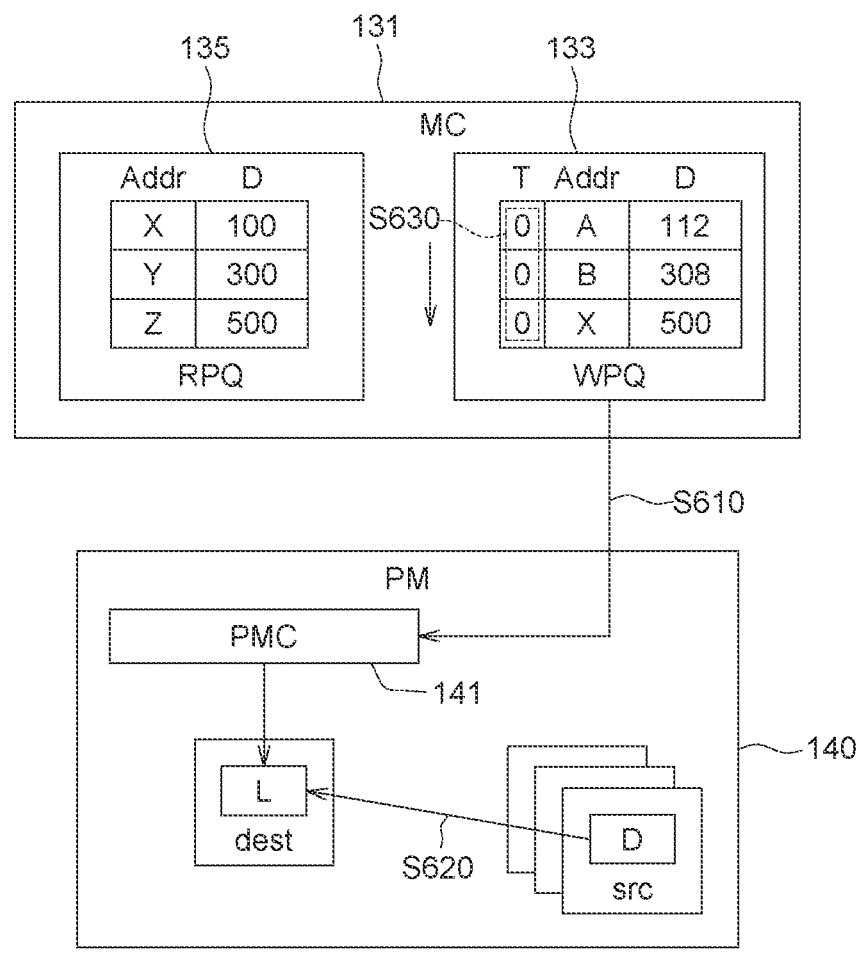
FIG. 6 shows undo logging in the PM according to one embodiment of the application.

FIG. 6 shows undo logging in the PM according to one embodiment of the application. As shown in FIG. 6, in the step 3610, based a scheduling policy designed in one embodiment of the application, undo log is prepared in background. Read requests have highest priority. But when the RPQ 135 is empty, before the WPQ drain is triggered, the undo log preparation request is scheduled. When the WPQ drain is triggered, the undo log preparation request is not scheduled, unless the WPQ 133 is stuffed by uncommitted redo logs.

In the step S620, the PM controller (PMC) 141 is requested to perform in-PM copy on the undo logs to log (copy) data from the source address into the destination address and the home address is recorded in metadata. One embodiment of the application introduces a log preparation request command: log-prep $src $dest, when "src" refers to a source address and "dest" refers to a destination address. In one embodiment of the application, based on locations of the source address and the destination address, three in-PM copy modes are introduced. After the step S620 is completed, the undo log is prepared.

In the step S630, when the undo log is prepared, the redo log in the WPQ 133 is transformed into a normal write request by for example but not limited by, resetting the T bit of the redo log as 0.

Figure 7:
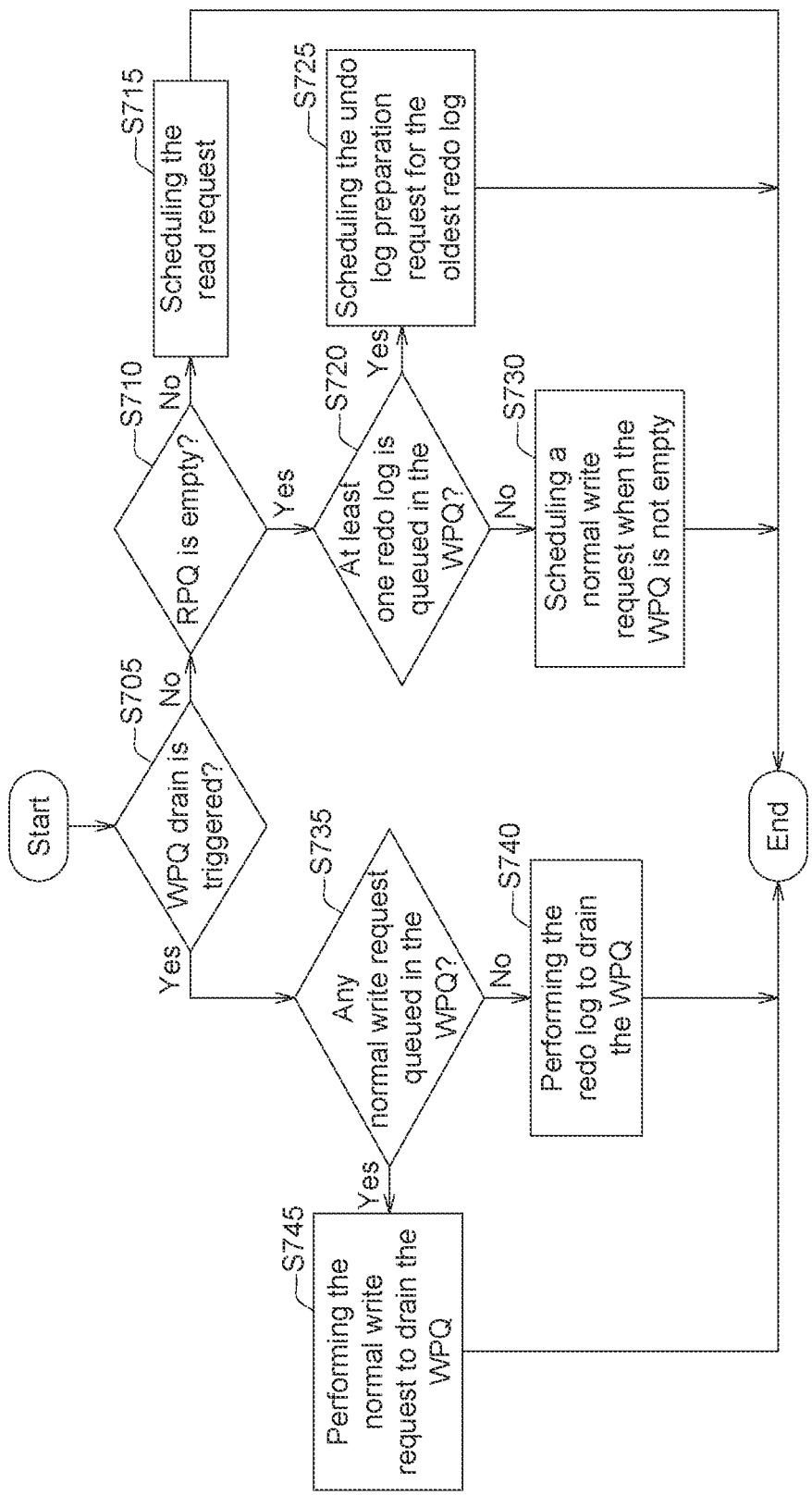
FIG. 7 shows a flow chart of the scheduling policy in one embodiment of the application.

The scheduling policy in one embodiment of the application is described. FIG. 7 shows a flow chart of the scheduling policy in one embodiment of the application. In the step S705, whether the WPQ drain is triggered is determined. When the WPQ drain is not triggered, the flow proceeds to the step S710; and when the WPQ drain is triggered, the flow proceeds to the step S735.

In the step S710, whether RPQ is empty is determined. When the RPQ is not empty, the read request is scheduled in the step S715. When the RPQ is empty, whether at least one redo log is queued in the WPQ is determined in the step S720. When there is at least one redo log queued in the WPQ, the undo log preparation request is scheduled for the oldest redo log (having data located in an idle memory bank) in the step S725. When there is no any redo log queued in the WPQ, a normal write request is scheduled in the step S730 in case that the WPQ is not empty.

In the step S735, whether there is any normal write request queued in the WPQ is determined. When there is no any normal write request queued in the WPQ, the redo log is performed to drain the WPQ in the step S740. When there is any normal write request queued in the WFQ, the normal write request is performed to drain the WPQ in the step S745, until the occupation rate of the WPQ is lower than the second reference value or when all normal write requests in the WFQ is performed. Thus, the redo logs are kept in the WFQ as long as possible to wait for the transaction commit signal and thus the needs to prepare undo logs during the WPQ drain are mitigated.

Figure 8:
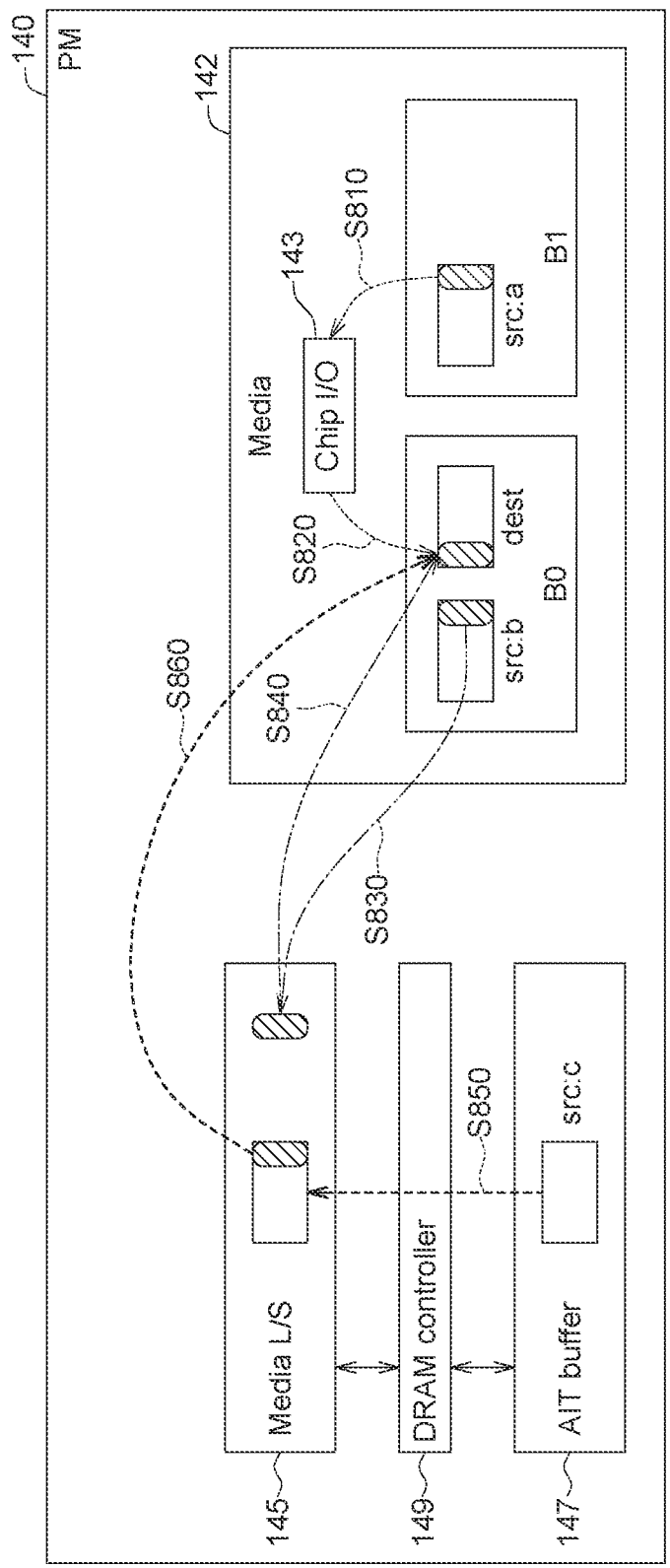
FIG. 8 shows three in-PM copy modes according to one embodiment of the application.

FIG. 8 shows three in-PM copy modes according to one embodiment of the application. The three in-PM copy modes according to one embodiment of the application are: an inter-bank copy mode, an intra-bank copy mode and a buffer-media copy mode.

The inter-bank copy refers to copy data between different memory banks. The inter-bank copy is shown as the steps S810 and S820. In the step S810, the source row and the destination row are activated, wherein the source row "a" is located in the memory bank B1 while the destination row "dent" is located in the memory bank B0. In the step S820, a transfer command is issued to copy data from the source row to the destination row through the chip I/O 143 of the media 142 of the PM 140.

The intra-bank copy refers to copy data inside the same memory bank. The intra-bank copy is shown as the steps S830 and S840. In the step S830, a read command is issued to read data from the source row "b" in the memory bank B0 (for example but not limited by, read 64 bytes data) to the media load/save (L/S) 145, In the step S840 the read out data is written from the media L/S 145 into the destination row "dest" in the memory bank B0.

Figure 9:
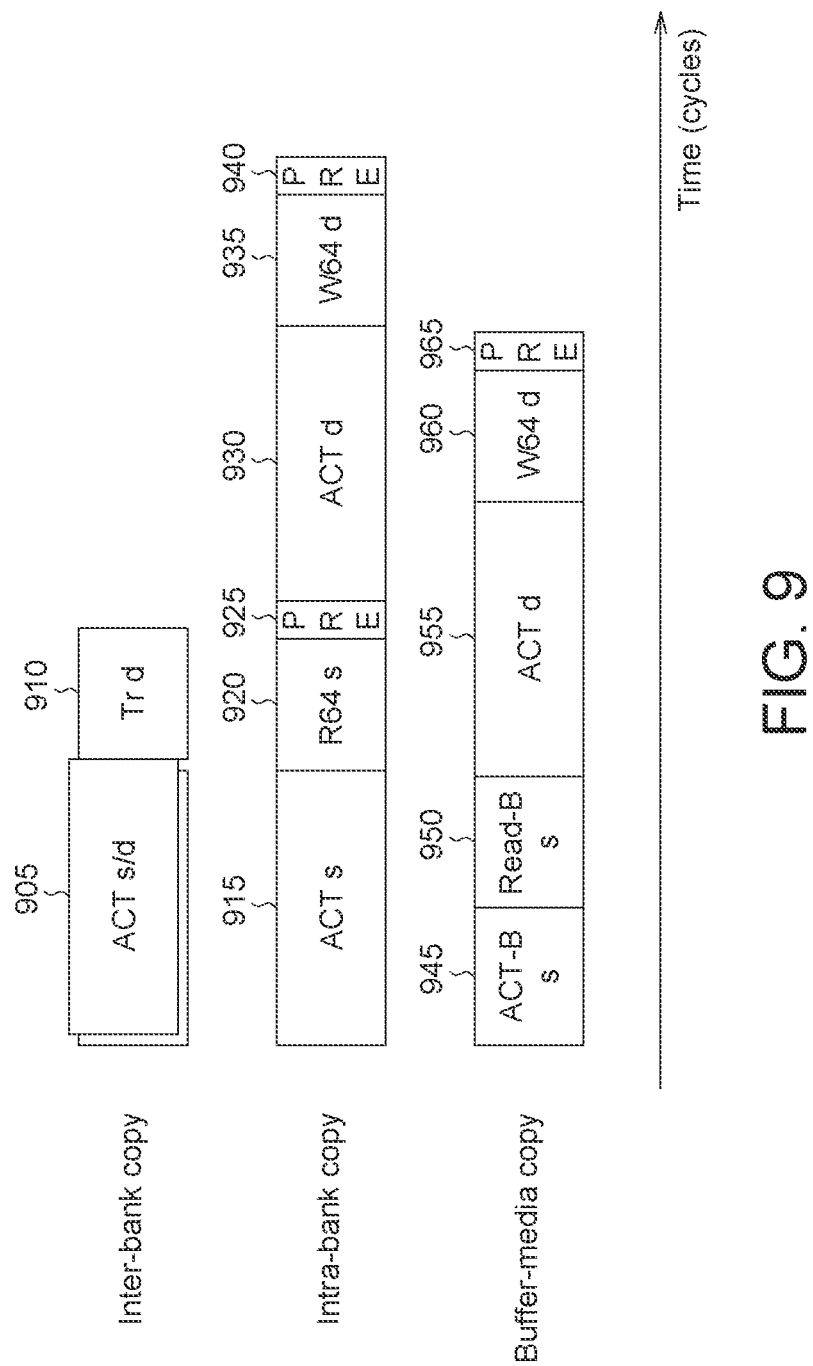
FIG. 9 shows command sequences of the three in-PM copy modes according to one embodiment of the application.

The buffer-media copy refers to copy data between the AIT (address in direction translation) buffer 147 and the media 142. The buffer-media copy is shown as the steps S850 and S860. In the step S850, the AIT buffer 147 is activated and data is read from the AIT buffer 147 via the DRAM controller 149 (for example but not limited by, read 4 KB data) to the media L/S 145. In the step S860, 64B data is written from the media L/S 145 into the destination row "dest" in the memory bank B0 of the media 142, FIG. 9 shows command sequences of the three in-PM copy modes according to one embodiment of the application. In the inter-bank copy mode, a source-row-destination-row activation command ACT s/d 905 is issued to activate the source row and the destination row. Then, a transfer command Trd 910 is issued to transfer data from the source row to the destination row via the chip I/O 143 on the PM 140.

In the intra-bank copy mode, a source-row activation command ACT s 915 is issued to activate the source row. A source row read command R64 s 920 is issued to read 64B (byte) data from the source row. A pre-charge command PRE 925 is issued to pre-charge the signal lines. A destination row activation command ACT d 930 is issued to activate the destination row. A write command W64 d 935 is issued to write 64B data into the destination row. A pre-charge command PRE 940 is issued to pre-charge the signal lines.

In the buffer-media copy mode, an AIT-buffer-source-row activation command ACT-B s 945 is issued to activate the source row in the AIT buffer. An AIT-buffer-source-row read command Read-B s 950 is issued to read data from the source row of the AIT buffer. A destination row activation command ACT d 955 is issued to activate the destination row. A write command W64 d 960 is issued to write 64B data into the destination row. A pre-charge command PRE 965 is issued to pre-charge the signal lines.

By comparing the command cycles in FIG. 9, in one embodiment of the application, the inter-bank copy mode has fastest copy speed, the intra-bank copy mode has slowest copy speed while the buffer-media copy mode has the medium speed.

Figure 10:
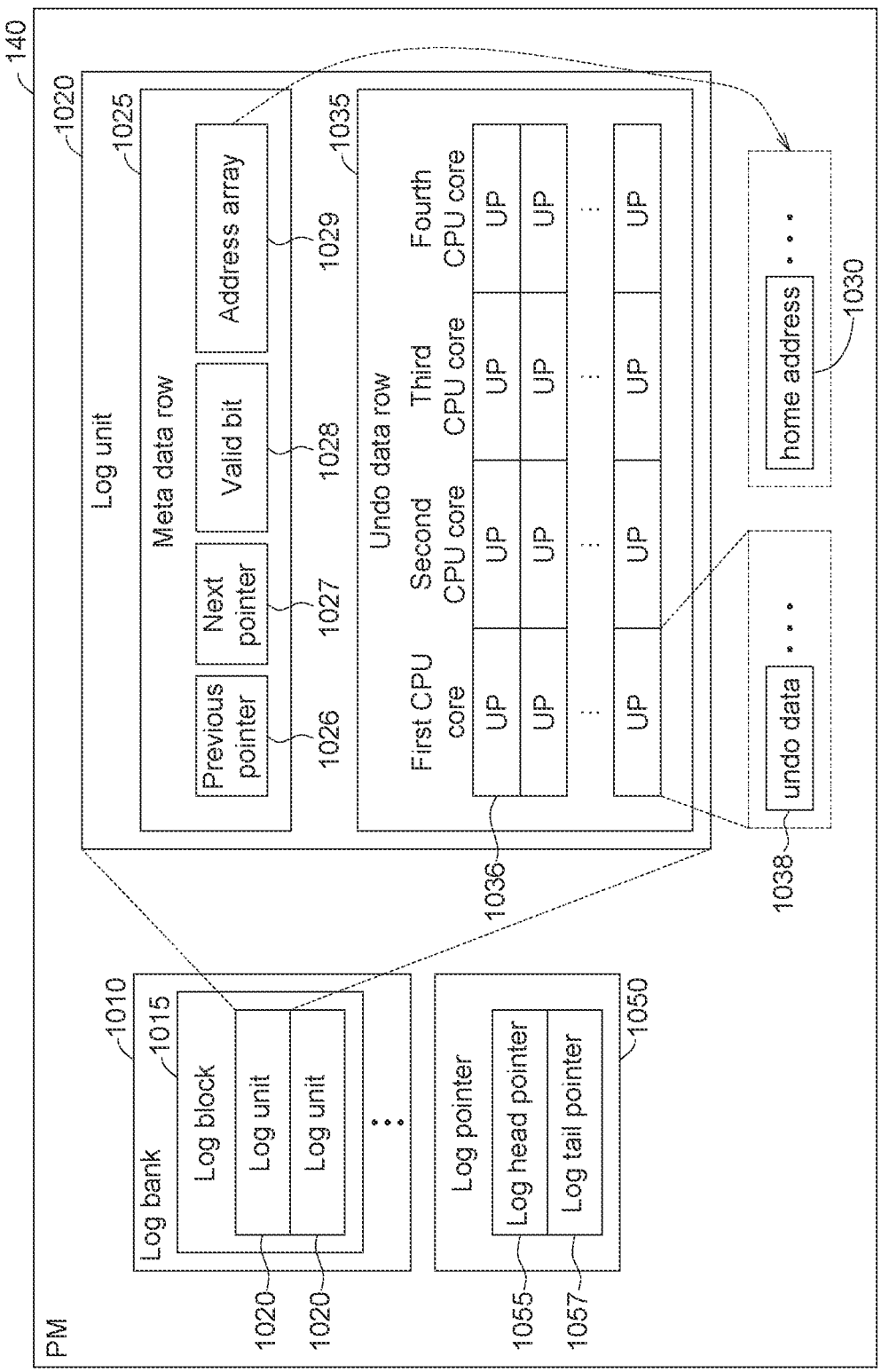
FIG. 10 shows undo log management and organization in one embodiment of the application.

FIG. 10 shows undo log management and organization in one embodiment of the application. As shown in FIG. 10, the PM 140 at least includes a log bank 1010 and a log pointer 1050. In the following, an example in which the CPU 110 includes four CPU cores is described, but the application is not limited by this. For example, in FIG. 2, the undo log 220 is stored in the log bank 1010.

The log bank 1010 includes a plurality of log blocks 1015. When all the current log blocks 1015 are not enough, a new log block 1015 is allocated. That is, the total number of the log blocks 1015 is dynamic. In the following, the log block 1015 has a size of 64 KB is as an example, but the application is not limited by this.

The log block 1015 includes two log units 1020. For example but not limited by, the log unit 1020 has a size of 32 KB.

The log unit 1020 includes a meta data row 1025 and multiple undo data rows 1035 (for example but not limited by, seven undo data rows 1035). For example but not limited by, the meta data row 1025 has a size of 4 KB while each of the undo data row 1035 has a size of 4 KB.

The meta data row 1025 includes: a previous pointer 1026, a next pointer 1027, an array of valid bits 1028 and an address array 1029. The previous pointer 1026 points to a previous log unit while the next pointer 1027 points to a next log unit. The valid bit 1028 refers to the validity of the undo data rows 1035 in the log unit 1020. The address array 1029 includes a plurality of home addresses 1030. For example but not limited by, the total number of the home addresses 1030 is 16*4*7=448. For example but not limited by, the address array 1029 has a size of 3.5 KB and the home address 1030 has a size of 8B.

The undo data row 1035 includes a plurality of undo data packets 1036. The undo data packets 1036 are evenly divided for the cores of the CPU 110. Each undo data packet 1036 includes a plurality of undo data 1038. For example but not limited by, the undo data packet 1036 includes sixteen undo data 1038; the undo data row 1035 has a size of 4 KB; the undo data packet 1036 has a size of 64B*16=1024B and the undo data 1038 has a size of 64B, The undo data 1038 and the home address 1030 are one-to-one.

The log pointer 1050 includes a log head pointer 1055 and a log tail pointer 1057. The log head pointer 1055 includes respective log head pointers of the four CPU cores of the CPU 110. For example but not limited by, each of the respective log head pointers of the four CPU cores of the CPU 110 has a size of 8B, then the log head pointer 1055 has a size of 8B*4=32B. The log tail pointer 1057 includes respective log tail pointers of the four CPU cores of the CPU 110, For example but not limited by, each of the respective log tail pointers of the four CPU cores of the CPU 110 has a size of 8B, then the log tail pointer 1057 has a size of 8B*4=32B.

In one embodiment of the application, the undo logs are allocated in the same memory bank (i.e. the log bank) while other data is allocated in other memory banks. By so, in performing in-PM copy (for example, the step S240 in FIG. 2), the fastest inter-bank copy mode may be adopted and bank conflicts are prevented.

Still further, in one embodiment of the application, each CPU core has its own log head pointer and log tail pointer, and the undo data row is evenly divided for the CPU cores. By so, the undo-log preparation request for the concurrently running transactions on the different CPU cores may hit the same undo data row to raise row hit rate.

Still further, when the transaction is committed (for example, the redo log 210 is written from the WPQ 133 of the MC 131 into the PM 140 and the redo log 210 rewrites the old data 215 as the data 225), the log head pointer and the log tail pointer point to the same address for achieving fast undo log invalidation.

In one embodiment of the application, for ensuring data integrity, it needs an old version of data having persistence and a new version of data having persistence. When the new data is written into the L1 cache, a new version of data having persistence is also kept in the WPQ of the MC. That is, in one embodiment of the application, a redo log is recorded in the MC. In one embodiment of the application, both the MC and the PM have persistence. The old version of data having persistence is stored in the PM. The new version of data having persistence is stored in the MC and then written into the PM. By so, even if disk is crashed, data is corrected recovered and data durability is achieved.

The above embodiment of the application is applicable to all types of persistence memories. The persistence memory may move or generate data internally. The PM may be non-volatile memory, including DRAM and flash memory.

In one embodiment of the application, preparing redo logs in the persistent MC while preparing undo logs in background, both double write issue and additional delay to read request latency are prevented.

In one embodiment of the application, new version of data is copied into the MC for achieving redo-log effects and the old version of data is copied inside the PM for achieving undo-log effects. Thus, one embodiment of the application provides hybrid logging for achieving asynchronous data update and direct data update and for maintaining data consistency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operation method for a memory system, the operation method comprising:
   receiving a first data in a first cache of a first memory from a processor;
   reading the first data from the first cache of the first memory and writing the first data as a redo log into a log buffer of the first memory, wherein the first data and the redo log are the same;
   writing the redo log from the log buffer into a memory controller of the processor;
   performing an in-memory copy in a second memory to copy a second data as an undo log, wherein the second data is an old version of the first data; and
   writing the redo log from the memory controller into the second memory for covering the second data by the redo log as a third data, wherein the redo log, the third data and the first data are the same, and the memory controller and the second memory have persistence.

2. The operation method for the memory system according to claim 1, wherein the first memory is a central processing unit (CPU) cache memory, and the second memory is a persistent memory.

3. The operation method for the memory system according to claim 1, wherein
   the first data is written from the first cache into a second cache of the first memory; and
   when the redo log is written from the log buffer into the memory controller, the first data in the second cache is discarded.

4. The operation method for the memory system according to claim 1, wherein when the log buffer is full or when the redo log is written from the log buffer into the memory controller, the redo log in the log buffer is evicted.

5. The operation method for the memory system according to claim 1, wherein
   in response to a transaction commit signal, the memory controller resets a bit of the redo log stored in the memory controller to transform the redo log into a normal write request; and
   when a read pending queue of the memory controller is empty or when a write pending queue (WPQ) drain is triggered, the normal write request stored in the memory controller is performed.

6. The operation method for the memory system according to claim 1, wherein in performing the in-memory copy in the second memory, undo log preparation is performed in background based on a scheduling policy.

7. The operation method for the memory system according to claim 6, wherein the scheduling policy includes:
   determining whether a write pending queue (WPQ) drain of the memory controller is triggered;
   when the WPQ drain is not triggered, determining whether a read pending queue (RPQ) of the memory controller is empty;
   when the RPQ is not empty, scheduling a read request;
   when the RPQ is empty, determining whether here is at least one redo log in the WPQ;
   when there is at least one redo log in the WPQ, scheduling an undo log preparation request for an oldest redo log;
   when there is no any redo log in the WPQ and when the WPQ is not empty, scheduling a normal write request;
   when the WPQ drain is triggered, determining whether there is any one normal write request in the WPQ;
   when there is no any normal write request in the WPQ, performing the redo log to drain the WPQ; and
   when there is any normal write request in the WPQ, performing the normal write request to drain the WPQ.

8. The operation method for the memory system according to claim 1, wherein there are three copy modes for the in-memory copy: inter-bank copy, intra-bank and buffer media copy.

9. The operation method for the memory system according to claim 8, wherein
   in performing inter-bank copy, activating a first source row and a destination row on different banks and copying data from the first source row to the destination row;
   in performing intra-bank, reading data from a second source row into a media load/save, and writing data from the media load/save to the destination row, wherein the second source row and the destination row are on the same bank; and
   in performing buffer media copy, activating an AIT (address in direction translation) buffer by the media load/save, reading data from the AIT buffer and writing data into the destination row from the medial load/save.

10. The operation method for the memory system according to claim 1, wherein
    each CPU core has respective log head pointer and respective log tail pointer; and
    when the redo log is written from the memory controller into the second memory, the log head pointer and the log tail pointer point to the same address.

11. A memory system comprising:
    a processor;
    a first memory coupled to the processor; and
    a second memory coupled to the first memory,
    wherein
    a first data is received in a first cache of the first memory from the processor;
    the first data is read from the first cache of the first memory and the first data is written as a redo log into a log buffer of the first memory, wherein the first data and the redo log are the same;
    the redo log is written from the log buffer into a memory controller of the processor;
    an in-memory copy is performed in the second memory to copy a second data as an undo log, wherein the second data is an old version of the first data; and
    the redo log is written from the memory controller into the second memory for covering the second data by the redo log as a third data, wherein the redo log, the third data and the first data are the same, and the memory controller and the second memory have persistence.

12. The memory system according to claim 11, wherein the first memory is a central processing unit (CPU) cache memory, and the second memory is a persistent memory.

13. The memory system according to claim 11, wherein the first data is written from the first cache into a second cache of the first memory; and
    when the redo log is written from the log buffer into the memory controller, the first data in the second cache is discarded.

14. The memory system according to claim 11, wherein when the log buffer is full or when the redo log is written from the log buffer into the memory controller, the redo log in the log buffer is evicted.

15. The memory system according to claim 11, wherein
    in response to a transaction commit signal, the memory controller resets a bit of the redo log stored in the memory controller to transform the redo log into a normal write request; and
    when a read pending queue of the memory controller is empty or when a write pending queue (WPQ) drain is triggered, the normal write request stored in the memory controller is performed.

16. The memory system according to claim 11, wherein in performing the in-memory copy in the second memory, undo log preparation is performed in background based on a scheduling policy.

17. The memory system according to claim 16, wherein the scheduling policy includes:
    determining whether a write pending queue (WPQ) drain of the memory controller is triggered;
    when the WPC) drain is not triggered, determining whether a read pending queue (RPQ) of the memory controller is empty;
    when the RPQ is not empty, scheduling a read request;
    when the RPQ is empty, determining whether there is at least one redo log in the WPQ;
    when there is at least one redo log in the WPQ, scheduling an undo log preparation request for an oldest redo log;
    when there is no any redo log in the WPQ and when the WPQ is not empty, scheduling a normal write request;
    when the WPQ drain is triggered, determining whether there is any one normal write request in the WPQ;
    when there is no any normal write request in the WPQ, performing the redo log to drain the WPQ; and
    when there is any normal write request in the WPQ, performing the normal write request to drain the WPQ.

18. The memory system according to claim 11, wherein there are three copy modes for the in-memory copy: inter-bank copy, intra-bank and buffer media copy.

19. The memory system according to claim 18, wherein
    in performing inter-bank copy, activating a first source row and a destination row on different banks and copying data from the first source row to the destination row;
    in performing intra-bank, reading data from a second source row into a media load/save, and writing data from the media load/save to the destination row, wherein the second source row and the destination row are on the same bank; and in performing buffer media copy, activating an AIT (address in direction translation) buffer by the media load/save, reading data from the AIT buffer and writing data into the destination row from the medial load/save.

20. The memory system according to claim 11, wherein each CPU core has respective log head pointer and respective log tail pointer; and
when the redo log is written from the memory controller into the second memory, the log head pointer and the log tail pointer point to the same address.

* * * * *